United States Patent [19]

Norberg

[11] Patent Number: 5,170,551
[45] Date of Patent: Dec. 15, 1992

[54] ALIGNMENT OF SHAFT FLANGES

[75] Inventor: Stefan Norberg, Hofors, Sweden

[73] Assignee: Ovako Steel Couplings AB, Sweden

[21] Appl. No.: 759,722

[22] Filed: Sep. 11, 1991

Related U.S. Application Data

[63] Continuation-in-part of Ser. No. 607,597, Oct. 31, 1990, abandoned, which is a continuation of Ser. No. 352,776, May 16, 1989, abandoned.

[30] Foreign Application Priority Data

Oct. 24, 1988 [SE] Sweden .................................. 8803794

[51] Int. Cl.$^5$ .......................... F16D 9/00; B21D 39/00
[52] U.S. Cl. ....................... 29/523; 29/525.1; 29/252; 411/55; 411/63; 411/389
[58] Field of Search ..................... 29/522.1, 523, 525.1, 29/252; 403/15, 337, 371, 408; 411/55, 63, 64, 389

[56] References Cited

U.S. PATENT DOCUMENTS

| | | | |
|---|---|---|---|
| 3,099,470 | 7/1963 | Zumbusch | 403/408.1 |
| 3,173,522 | 3/1965 | Zimmer et al. | 403/337 |
| 4,192,621 | 3/1980 | Barth | 403/15 |
| 4,496,259 | 1/1985 | Foucher | 403/337 X |
| 4,607,971 | 8/1986 | Hartmann et al. | 403/337 X |
| 4,743,138 | 5/1988 | Goy | 403/337 |

FOREIGN PATENT DOCUMENTS

| | | | |
|---|---|---|---|
| 1750905 | 12/1970 | Fed. Rep. of Germany . | |
| 2540223 | 2/1983 | France . | |
| 97829 | 1/1940 | Sweden | 403/337 |
| 446683 | 12/1974 | U.S.S.R. | 403/337 |
| 1032-260-A | 7/1983 | U.S.S.R. . | |

Primary Examiner—Timothy V. Eley
Attorney, Agent, or Firm—Ostrolenk, Faber, Gerb & Soffen

[57] ABSTRACT

When aligning heavy shafts, their flanges (4, 5) are first roughly aligned, after which an expander bolt (10) is inserted through the roughly aligned flange holes (16). The expander bolts have a conical core (6) and internally conical sleeves (1, 2) arranged axially separated from each other thereon. First the sleeves (1, 2) are inserted into the relevant flange (4, 5) to the plane (50) between the shaft flanges. Then the bolt core (6) is inserted through the sleeves (1, 2), the front end of the conical section (64) passing the plane (20) between the sleeves (1, 2). In order to keep the nearest sleeve (1) at the plane (50) when the bolt core (6) is being drawn, a spacer (8) is used which is placed on the drawn end of the bolt shaft (6) and has a head (86) located between a drawing device (7) fitted on the bolt shaft (6) and the exposed end surface (41) of the adjacent shaft flange.

13 Claims, 1 Drawing Sheet

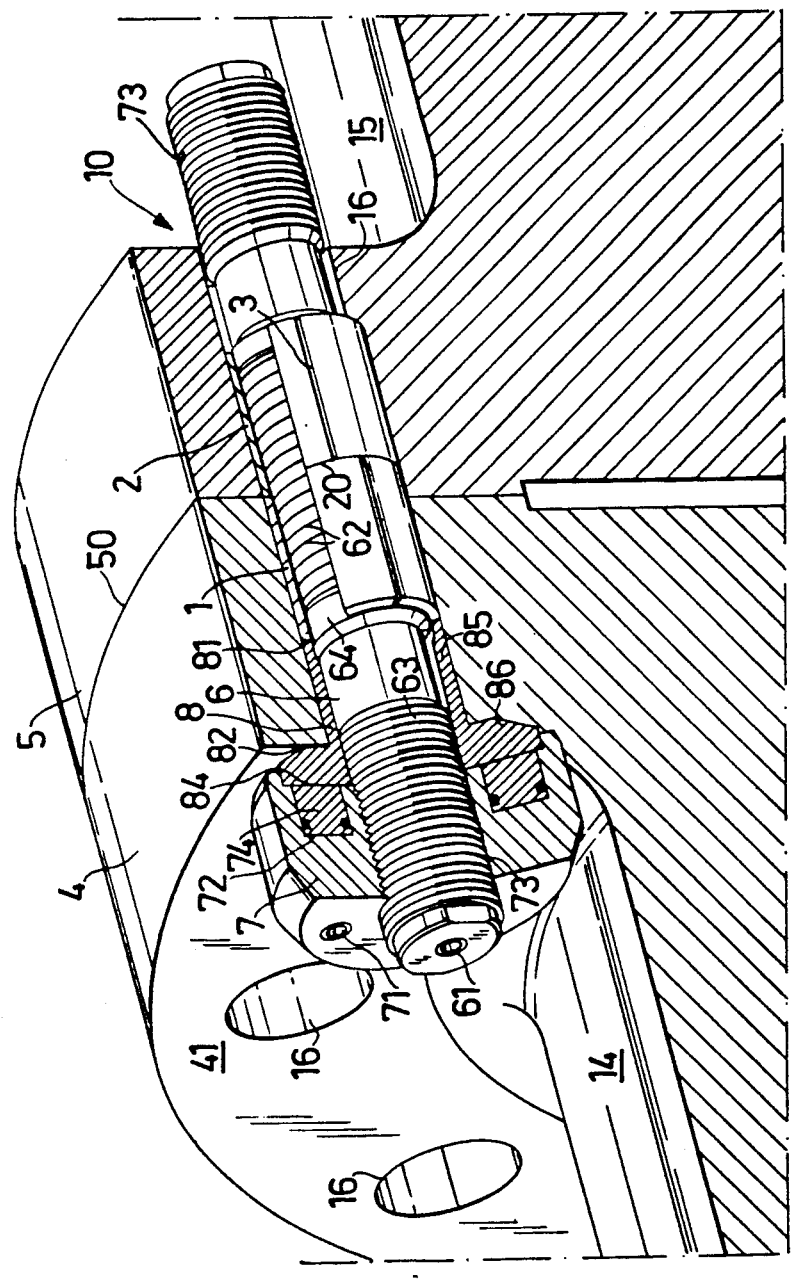

ALIGNMENT OF SHAFT FLANGES

This is a continuation-in-part of application Ser. No. 07/607,597, filed on Oct. 31, 1990, now abandoned, which was a continuation of application Ser. No. 07/352,776, filed on May 16, 1989, now abandoned.

BACKGROUND OF THE INVENTION

When aligning heavy shafts it is relatively easy to achieve a position in which the holes of the shaft flanges are substantially aligned, i.e. a position in which the alignment is only 1-2 mm off, for instance.

However, it is difficult and time-consuming to perform the final accurate alignment so that the flange holes are brought into perfect coaxial alignment.

SUMMARY OF THE INVENTION

The object of the invention is to offer a technique permitting relatively fast and simple alignment of shaft flanges with appropriate axial bolt holes in order to facilitate correct and faster alignment of shaft flanges.

The basic idea of the invention is that a rough alignment of the machine elements is carried out first, so that the holes therein are roughly aligned and are only displaced in relation to each other by at most about 1-2 mm, for instance. It may be shaft flanges that are being aligned or a machine stand which is being aligned to a foundation or the like. Expander bolts are then inserted in at least some of the roughly aligned machine element holes and the bolts are expanded, resulting in fine adjustment of the holes, and thus the machine elements. The expander bolts are suitably provided with an internally conical outer sleeve, divided into two sections, which cooperates with a correspondingly conical bolt core. The two sleeves forming the outer sleeve are inserted in respective bolt holes in each of the two machine elements, after which the core is passed through the sleeves so that the front part of the conical section of the core passes the joint between the sleeves. The bolt core is then drawn or pressed through the sleeves, thus aligning the sleeves, and thereby displacing the two machine elements so that their bolt holes are aligned.

The external shape and size of the sleeves may thus closely resemble the shape and size of the holes in the machine elements. The sleeves may thus be solid, and the pressure oil method can be used, for instance, when the core is to be removed from the sleeves. If the sleeves are to be expanded to any great extent, this can be done within the elastic region. It should also be clear that axially slotted sleeves can also be used in order to permit particularly great expansion, i.e. when the rough alignment of the machine elements is relatively poor.

The bolt shaft may be provided with a coupling member, such as a tapped shaft portion at each end, in which case a drive means such as a nut-like, threaded hydraulic drawing means may be connected thereto and act against the adjacent flange surface via a tubular spacer supporting against the flange surface, its smaller end defining the position of the adjacent sleeve. It should thus be clear that the bolt core may be either pressed or drawn into the sleeves for alignment/expansion purposes.

It should also be clear that the preferred embodiment of the device need not necessarily be driven in order to effect substantial expansion of the outer diameter of the sleeves, and that therefore the expression "expander bolt" shall be interpreted as a construction comprising a sleeve which could expand but which does not necessarily expand upon performance of the invention.

BRIEF DESCRIPTION OF THE DRAWING

The single FIGURE of the drawing shows in perspective an axial section through a part of the shaft flange joint.

DETAILED DESCRIPTION OF THE PREFERRED EMBODIMENT

The drawing thus shows two heavy shafts 14, 15 aligned to each other by means of flanges 4, 5 provided with axial holes 16 distributed around the flange. The holes 16 are arranged to correspond with each of the two flanges and are thus coaxial when the shafts 14 and 15 are fully aligned with each other.

Using conventional means not shown here, the shafts 14, 15 can be roughly aligned to a position where the flanges 4, 5 are substantially adjacent and where the holes 16 in the flanges 4, 5 are only slightly displaced, by up to 1-2 mm. Expander bolts 10 (only one of which is shown in the drawing) are inserted in the roughly aligned flange holes 16 and then expanded to achieve perfect alignment of the holes 16 to each other. The expander bolts 10 comprise a bolt core 6 with a conical section 64 overbridging the gap 50 between the flanges 4, 5. Over the conical section 64 of the bolt core is a tubular element, conical on the inside and divided into two longitudinal portions or sleeves 1, 2 having a common central axis, the joint 20 between the portions 1, 2 lying in the same plane as the plane of the joint 50 between the flanges 4, 5. The sleeves 1, 2 are provided with axial slits 3 permitting a considerable increase in the effective outer diameter of the expander bolt 10 as defined by the external surface of the sleeves 1 and 2. Both of the sleeves 1, 2 have conical inner surfaces with the same conicity as the central section 64 of the core, the external surfaces of the sleeves 1, 2 thus defining a cylinder. Sleeves 1, 2 each have two circular ends (when viewed from an end) and, when arranged on conical section 64, two circular ends of sleeves 1, 2 are arranged in abutment.

The bolt core 6 is provided at each end with a tapped portion 73 extending out of each hole 16.

A tubular spacer 8 is provided with a head 86 and shaft 85, the shaft extending into the hole 16. The end 81 of the spacer shaft 85 abuts the end of the sleeve 1, and spacer head 86 has an end surface abutting the exposed end surface 41 of the shaft flange 4. The axial position of the sleeves 1, 2 is thus defined so that the joint 20 between the sleeves 1, 2 and the joint 50 between the flanges 4, 5 will lie in a common plane.

A drawing device 7 is screwed along a screw-thread 73 to the outer thread 63 on the bolt shaft 6 and abuts the head 86 of the spacer 8. The drawing device 7 is provided with a hydraulic chamber 72 with axially movable piston 74 which operates against the axially outer surface 84 of the spacer head 86. By introducing hydraulic fluid through the nipple 71, the chamber 72 can be pressurized so that the piston 74 rests against the outer surface 41 of the flange 4 via the spacer 8, thus positioning the spacer in relation to the surface 41. The shaft 6 of the expander bolt is thus drawn to the left in the drawing, thus expanding the sleeves 1, 2 radially. This expansion of the two sleeves 1, 2 will cause the flanges 4, 5 to be mutually displaced to achieve full coaxial alignment between the holes 16 without any shearing occuring in the sleeves 1, 2 since they are separate from each other. The bolt shaft 6 may be provided in conventional manner with a nipple 61 for pressure oil which is conveyed through a channel, not shown, to distribution grooves on the conical, central, outer surface 64 of the shaft in order to facilitate the axial relative displacement between the bolt shaft 6 and sleeves 1, 2 when the sleeves are solid, i.e. are not provided with axial slots 3 or the like.

Since the bolt shaft 6 is provided with a threaded portion 73 at each end, the expander bolt can easily be removed by removing the spacer 8 and hydraulic device 7 from the lefthand part of the core 6 as shown in the drawing. It can then be assembled on the righthand part of the shaft 6 as seen in the drawing, so that the core is drawn out of the sleeves when hydraulic fluid is forced into the nipple 71.

The drawing shows a joint between two shaft flanges, but it should be evident that the invention is also applicable to similar joints between other machine elements of similar type in which the basic problem is inherent.

A favourable embodiment of the invention entails both sleeves 1, 2 being first inserted into respective flange holes 16 up to the join plane 50. The core 6 is then passed through the sleeves 1, 2, at least far enough for the front end of the conical section 64 to pass the joint 20, 50. The bolt core 6 can then be driven further in by suitable drive means. The embodiment just mentioned allows favourable use to be made of the conicity of the section 64. The sleeves 1, 2 may thus have an external diameter almost corresponding to the diameter of the holes 16 while still allowing the front part of the conical section of the bolt core to pass freely through the sleeves, past the plane 20, 50, so long as the diameter of the front end of the conical section is less than the smallest dimension of the remaining passage through the radially displaced sleeves at the 20.

Since the sleeves 1, 2 themselves need not necessarily be expanded radially to any great extent, they may be solid and may even be deformed elastically. This permits practical use of the "pressure oil method", particularly when the expander bolt is to be removed. The sleeves may preferably have an external diameter corresponding to the flange hole in which it is to be inserted and the internal surfaces of a pair of adjacent sleeves may preferably have the same diameter as the plane.

I claim:

1. A method of accurately aligning first and second holes, the method comprising the steps of:
   (A) roughly aligning said holes;
   (B) positioning an alignment device within said holes, said alignment device including:
      (a) an elongated core with a first end, a second end and a conical section, said conical section being located between said ends and within both of said holes; and
      (b) first and second axially separated sleeves having a common central axis, each of said sleeves having an outer cylindrical surface and an inner conical surface, said inner conical surface of said first sleeve being concentric with said outer cylindrical surface of said first sleeve, said inner conical surface of said second sleeve being concentric with said outer cylindrical surface of said second sleeve, the conicity of said inner conical surface of said first sleeve and the conicity of said inner conical surface of said second sleeve corresponding to the conicity of said conical section of said elongated core, each of said sleeves having a circular end, said sleeves being arranged on said conical section of said elongated core with said circular ends abutting; and
   (C) subsequently, axially displacing said conical section of said core in a first direction through said holes and through said sleeves, and thereby accurately aligning said holes.

2. A method as claimed in claim 1, further comprising the step of axially displacing said conical section of said core in a second direction through said holes and through said sleeves, and thereby loosening said device from said holes, said second direction being opposite to said first direction.

3. A method as claimed in claim 2, wherein the step of axially displacing said conical section in said first direction includes pushing a spacer against said first sleeve in said second direction, the step of axially displacing said conical section in said second direction including pushing said spacer against said second sleeve in said first direction.

4. A method as claimed in claim 3, wherein said holes meet each other along a plane, said sleeves meeting each other along said plane.

5. A method as claimed in claim 3, wherein the step of displacing said conical section in said first direction includes expanding said sleeves.

6. A method as claimed in claim 3, wherein said holes are located within flanges of respective shafts.

7. A device for aligning first and second holes, said device comprising:
   an elongated core with a first end, a second end and a conical section, said conical section being located between said ends;
   first and second axially separated sleeves having a common central axis, each of said sleeves having an outer cylindrical surface and an inner conical surface, said inner conical surface of said first sleeve being concentric with said outer cylindrical surface of said second sleeve, the conicity of said inner conical surface of said first sleeve and the conicity of said inner conical surface of said second sleeve corresponding to the conicity of said conical section of said elongated core, each of said sleeves having a circular end, said sleeves being arranged on said conical section of said elongated core with said circular ends abutting; and
   displacing means for axially displacing said conical section of said core in a first direction through the holes and through the sleeves, to thereby align the holes.

8. A device as claimed in claim 7, wherein said displacing means is connectable to said first end of said core and includes (1) a spacer which fits within the first hole and which surrounds said core and (2) pushing means for pushing said spacer against said first sleeve and against a surface in the vicinity of the first hole.

9. A device as claimed in claim 8, wherein said displacing means is connectable to said second end of said core, said spacer and said pushing means being adapted to axially displace said conical section in a second direction through the holes and through said sleeves, to thereby loosen said device from the holes, said second direction being opposite to said first direction.

10. A device as claimed in claim 9, wherein said spacer includes an end for pushing against said first sleeve, a head for pushing against the surface in the vicinity of the first hole and a shaft, said shaft being located between said head and said end of said spacer, said head having a greater diameter than said first sleeve.

11. A device as claimed in claim 10, wherein said pushing means includes a piston and means for hydraulically pushing said piston against said head.

12. A device as claimed in claim 11, wherein said first and second ends are threaded, said displacing means being adapted to be threaded onto said first and second ends.

13. A device as claimed in claim 9, wherein said core includes channels for introducing oil between said conical section and said sleeves.

* * * * *